(12) United States Patent
Mitsui

(10) Patent No.: US 12,253,758 B2
(45) Date of Patent: Mar. 18, 2025

(54) ILLUMINATION DEVICE AND DISPLAY DEVICE

(71) Applicant: Japan Display Inc., Tokyo (JP)

(72) Inventor: Masashi Mitsui, Tokyo (JP)

(73) Assignee: Japan Display Inc., Tokyo (JP)

( * ) Notice: Subject to any disclaimer, the term of this patent is extended or adjusted under 35 U.S.C. 154(b) by 645 days.

(21) Appl. No.: 17/680,571

(22) Filed: Feb. 25, 2022

(65) Prior Publication Data

US 2022/0179271 A1 Jun. 9, 2022

Related U.S. Application Data

(63) Continuation of application No. PCT/JP2020/027265, filed on Jul. 13, 2020.

(30) Foreign Application Priority Data

Sep. 5, 2019 (JP) .................................. 2019-162182

(51) Int. Cl.
*G09G 3/19* (2006.01)
*G02F 1/13357* (2006.01)
*G02F 1/1506* (2019.01)

(52) U.S. Cl.
CPC ...... *G02F 1/133615* (2013.01); *G02F 1/1506* (2013.01)

(58) Field of Classification Search
CPC .......... G02F 2201/44; G02F 2201/1502–1557; G02F 1/15–163; G09G 3/19; G09G 3/3433; G09G 3/38

See application file for complete search history.

(56) References Cited

U.S. PATENT DOCUMENTS

| 2013/0286334 A1 | 10/2013 | Satoh et al. |
| 2018/0299739 A1 | 10/2018 | Kato |
| 2018/0356657 A1* | 12/2018 | Xu .......................... G02F 1/137 |

(Continued)

FOREIGN PATENT DOCUMENTS

| CN | 109633999 A | 4/2019 |
| JP | 2005-275261 A | 10/2005 |

(Continued)

OTHER PUBLICATIONS

Search Report issued in International Patent Application No. PCT/JP2020/027265 on Sep. 15, 2020 and English translation of same. 7 pages.

(Continued)

*Primary Examiner* — Sanghyuk Park
(74) *Attorney, Agent, or Firm* — K&L Gates LLP

(57) ABSTRACT

According to one embodiment, an illumination device includes an electrochromic element and light sources. The electrochromic element includes a first transparent substrate, a first transparent electrode provided on the first transparent substrate, a second transparent substrate opposing the first transparent substrate, projections provided on the second transparent substrate and projecting toward the first transparent substrate, a second transparent electrode provided on a part of the projection and an electrolyte layer provided between the first transparent substrate and the second transparent substrate and containing an electrochromic material including a reflective material capable of oxidation-reduction.

16 Claims, 11 Drawing Sheets

(56) References Cited

U.S. PATENT DOCUMENTS

2019/0250481 A1 8/2019 Xu et al.
2020/0234664 A1 7/2020 Li

FOREIGN PATENT DOCUMENTS

| JP | 2012-181389 A | 9/2012 |
| JP | 2018-045104 A | 3/2018 |
| JP | 2018-180351 A | 11/2018 |
| WO | WO 2012/086516 A1 | 6/2012 |

OTHER PUBLICATIONS

Written Opinion issued in International Patent Application No. PCT/JP2020/027265 on Sep. 15, 2020 and English translation of same. 4 pages.

\* cited by examiner

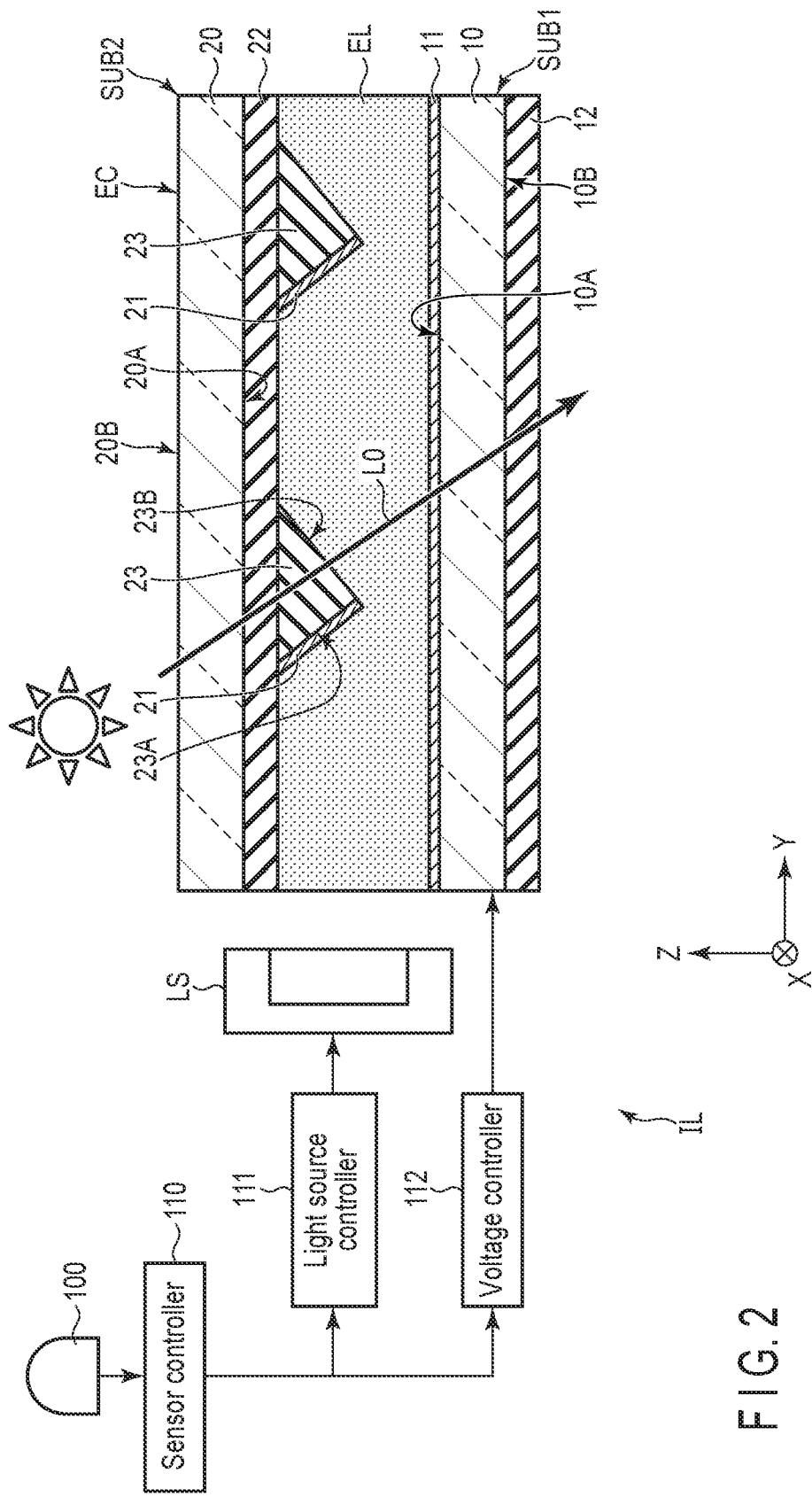
F I G. 2

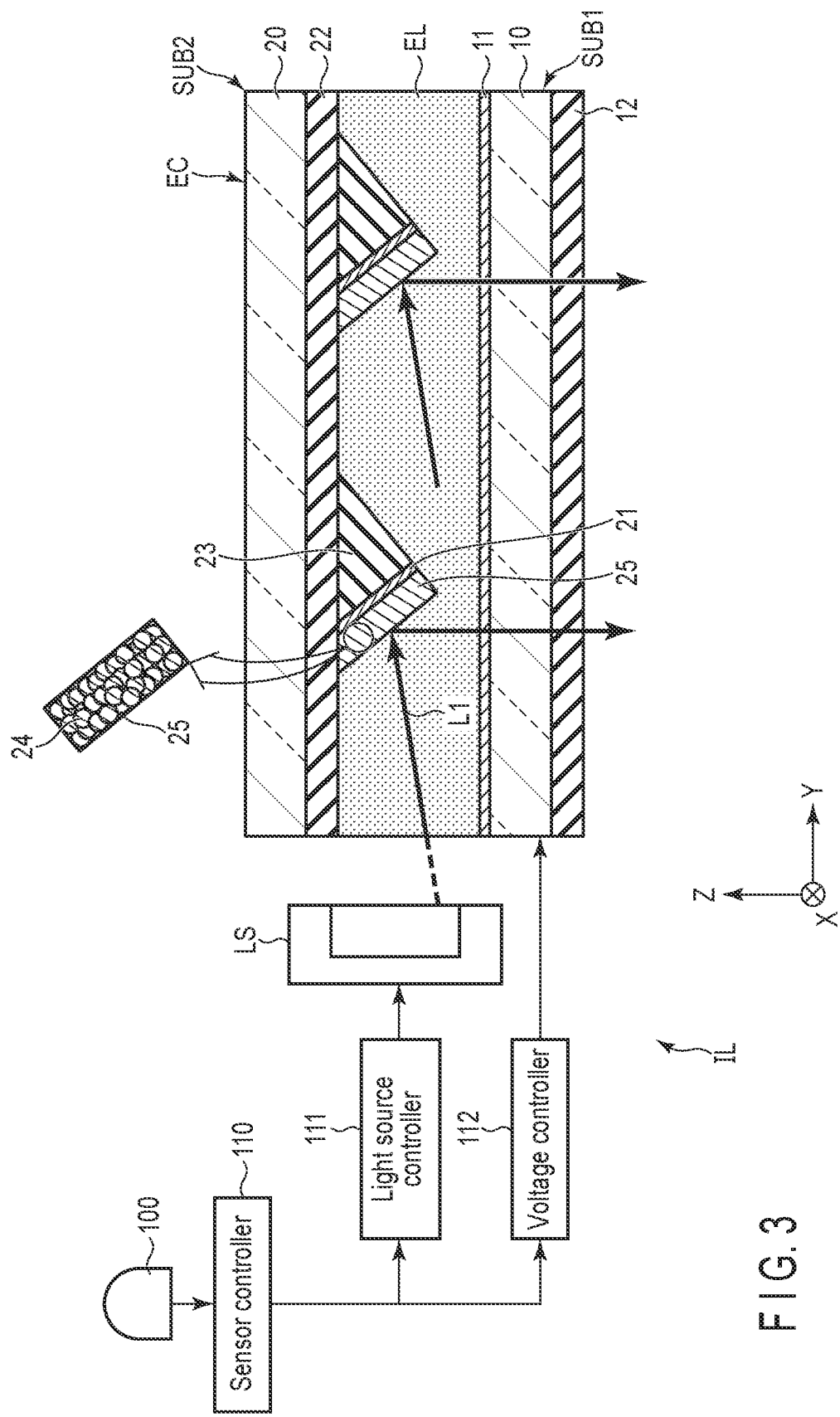
F I G. 3

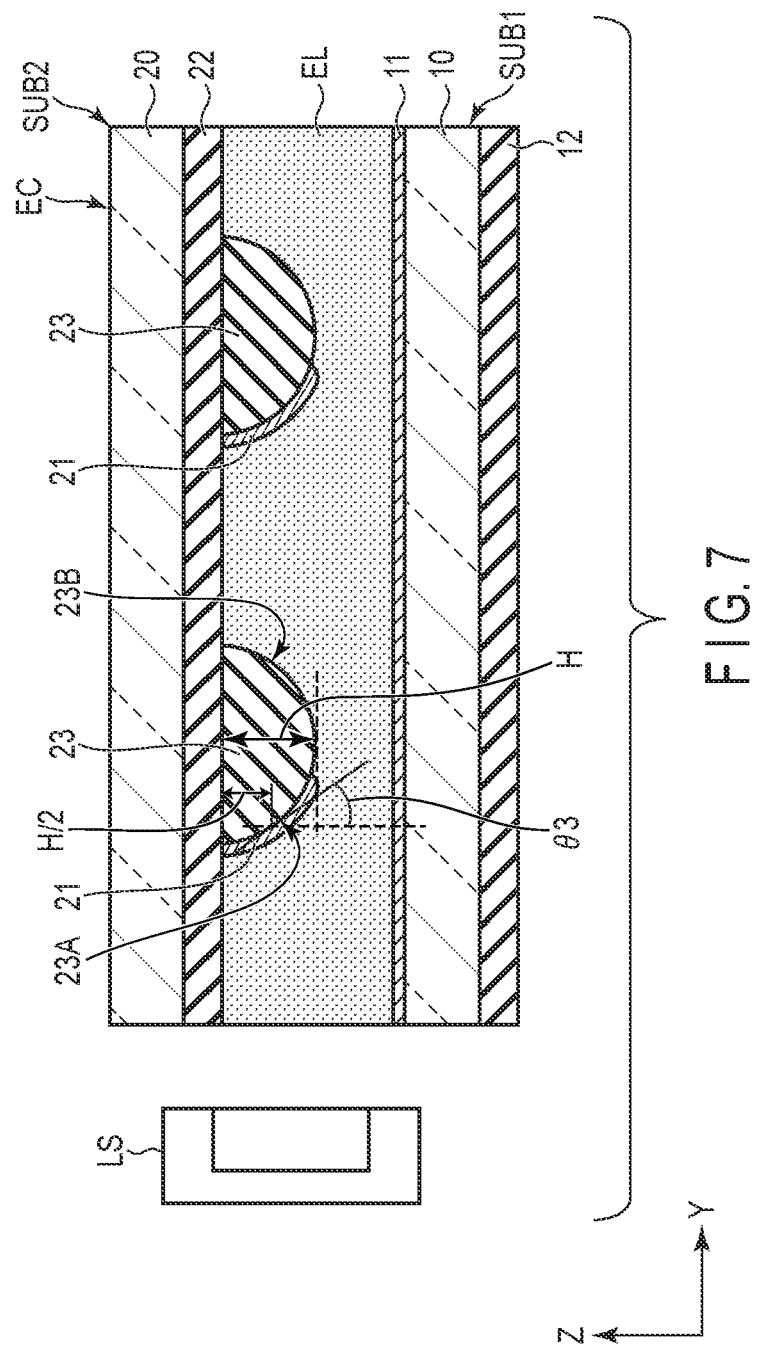
F I G. 7

ILLUMINATION DEVICE AND DISPLAY DEVICE

CROSS-REFERENCE TO RELATED APPLICATIONS

This application is a Continuation Application of PCT Application No. PCT/JP2020/027265, filed Jul. 13, 2020 and based upon and claiming the benefit of priority from Japanese Patent Application No. 2019-162182, filed Sep. 5, 2019, the entire contents of all of which are incorporated herein by reference.

FIELD

Embodiments described herein relate generally to an illumination device and a display device.

BACKGROUND

As an example of display devices, an electrochromic display device comprising a pair of electrodes and an electrolyte layer containing an electrochromic material interposed between these electrodes is proposed. Such a display device is configured to switch between a transparent state, a mirror state, and a light-shielding (black) state by controlling the voltage applied to the electrolyte layer.

BRIEF DESCRIPTION OF THE DRAWINGS

FIG. 2 is a diagram illustrating a first mode in the illumination device IL shown in FIG. 1.

FIG. 3 is a diagram illustrating a second mode in the illumination device IL shown in FIG. 1.

FIG. 7 is a cross-sectional view showing still another configuration example of the electrochromic element EC.

DETAILED DESCRIPTION

Figure 1:
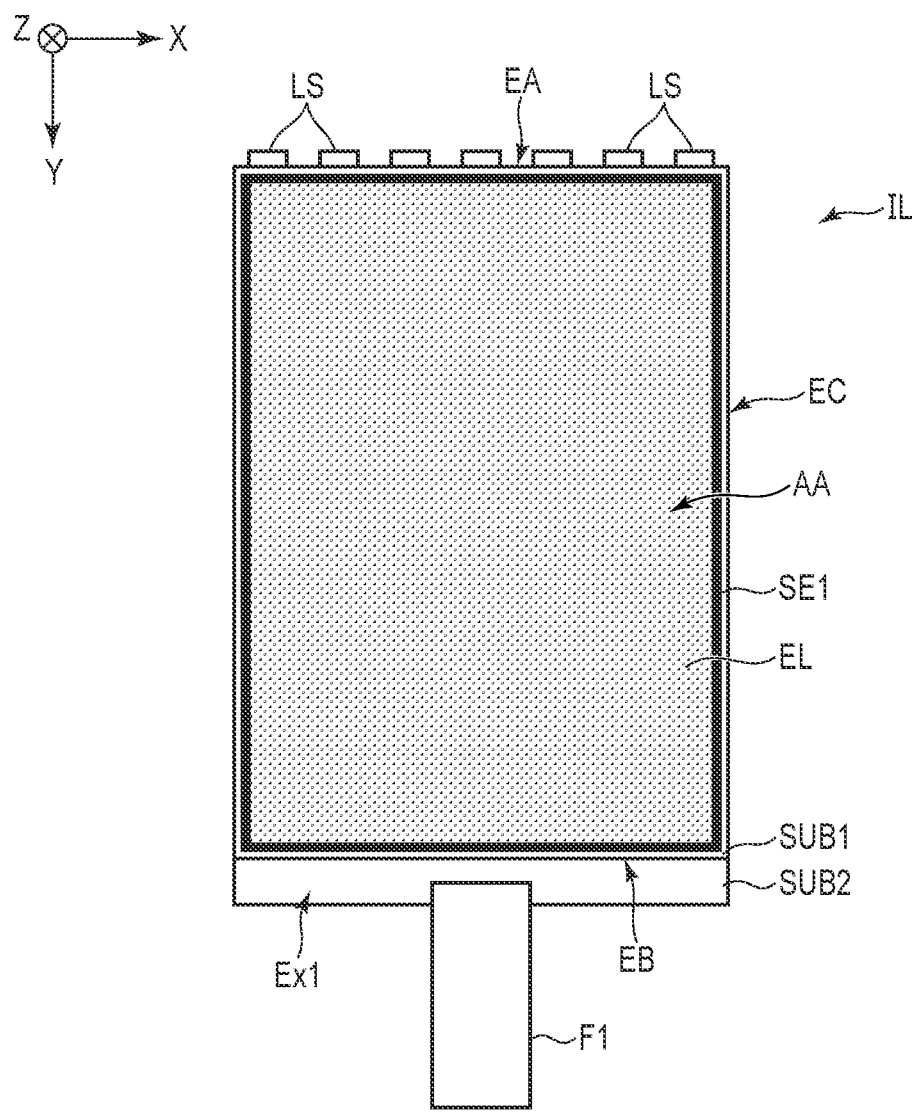
FIG. 1 is a plan view showing a configuration example of an illumination device IL according to an embodiment.

In general, according to one embodiment, an illumination device includes an electrochromic element and a light source provided on a side edge of the electrochromic element, and the electrochromic element comprises a first transparent substrate, a first transparent electrode provided on the first transparent substrate, a second transparent substrate opposing the first transparent substrate, a projection provided on the second transparent substrate and projecting toward the first transparent substrate, a second transparent electrode provided on a part of the projection and an electrolyte layer provided between the first transparent substrate and the second transparent substrate and containing an electrochromic material including a reflective material capable of oxidation-reduction.

According to another embodiment, a display device comprises a reflective display panel, an electrochromic element overlapping the display panel and a light source provided on a side edge of the electrochromic element, and the electrochromic element comprises a first transparent substrate, a first transparent electrode provided on the first transparent substrate, a second transparent substrate opposing the first transparent substrate, a projection provided on the second transparent substrate and projecting toward the first transparent substrate, a second transparent electrode provided on a part of the projection and an electrolyte layer provided between the first transparent substrate and the second transparent substrate and containing an electrochromic material including a reflective material capable of oxidation-reduction.

According to the present embodiments, an illumination device and a display device that can improve the use efficiency of light can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof may be omitted unless otherwise necessary.

Illumination Device

FIG. 1 is a plan view showing a configuration example of the illumination device IL of one embodiment. For example, a first direction X, a second direction Y and a third direction Z are orthogonal to each other, but may intersect at an angle other than 90°. The first direction X and the second direction Y correspond to directions parallel to a main surface of a substrate which constitutes the illustration device IL, and the third direction Z corresponds to a thickness direction of the illustration device IL. In the following descriptions, viewing an X-Y plane defined by the first direction X and the second direction Y is referred to as plan view.

The illumination device IL comprises an electrochromic element EC, light sources LS and a wiring substrate F1.

The electrochromic element EC comprises a first substrate SUB1, a second substrate SUB2, an electrolyte layer EL and a sealant SE1. The first substrate SUB1 and the second substrate SUB 2 overlap each other in plan view. The first substrate SUB1 and the second substrate SUB2 are bonded together by the sealant SE1. The electrolyte layer EL is held between the first substrate SUB1 and the second substrate SUB2 and is sealed by the sealant SE1. The region enclosed by the sealant SE1 is referred to as an effective area or active area AA.

The wiring substrate F1 is mounted on an extended portion Ex 1 of the second substrate SUB2. The extended portion Ex1 corresponds to the portion of the second substrate SUB2, which does not overlap the first substrate SUB1. The wiring substrate F1 is, for example, a bendable flexible printed circuit board.

The light sources LS are each, for example, a light-emitting diode, and emit white illumination light. The light sources LS are provided on a side edge EA of the electrochromic element EC, and emit illumination light toward the side edge EA. In the example shown in FIG. 1, the electrochromic element EC is formed into a rectangular shape in plan view, and the side edge EA corresponds to a short side of the electrochromic element EC. Note that the light sources LS may as well be provided on a side edge corresponding to a long side of the electrochromic element EC. Or, the light source LS may be provided on the extended portion Ex1. The light sources LS are arranged to be spaced apart from each other along the first direction X.

FIG. 2 is a diagram illustrating the first mode in the illumination device IL shown in FIG. 1.

First, with reference to FIG. 2, an example of the cross-sectional structure of the electrochromic element EC will be described.

The first substrate SUB1 comprises a first transparent substrate 10, a first transparent electrode 11 and a first transparent layer 12. The first transparent substrate 10 includes an inner surface 10A on a side facing the electrolyte layer EL and an outer surface on an opposite side to the inner surface 10A. The first transparent electrode 11 is provided on the inner surface 10A of the first transparent substrate 10. The first transparent layer 12 is provided on the outer surface 10B of the first transparent substrate 10. The first transparent electrode 11 and the first transparent layer 12 are formed over substantially the entire active area AA. The first transparent layer 12 may be provided between the first transparent substrate 10 and the first transparent electrode 11.

The second substrate SUB2 comprises a second transparent substrate 20, second transparent electrodes 21, a second transparent layer 22 and projections 23. The second transparent substrate 20 includes an inner surface 20A on a side facing the electrolyte layer EL and an outer surface 20B on an opposite side to the inner surface 20A. The second transparent layer 22 is provided on the inner surface 20A of the second transparent substrate 20. The projections 23 are provided on an inner surface 20A side of the second transparent substrate 20, and project toward the first transparent substrate 10. In the example shown in FIG. 2, the projections 23 are provided to be in contact with the second transparent layer 22. The second transparent layer 22 is formed over substantially the entire active area AA shown in FIG. 1 and is provided between each pair of projections 23 adjacent to each other along the second direction Y. The second transparent electrode 21 is provided on a part of each of the projections 23. Each second transparent electrode 21 faces the first transparent electrode 11 along the third direction Z while interposing the electrolyte layer EL therebetween.

The first transparent substrate 10 and the second transparent substrate 20 are, for example, insulating substrates such as of glass substrate or resinsubstrate. The first transparent electrode 11 and the second transparent electrode 21 are made, for example, of a transparent conductive material such as indium tin oxide (ITO) or indium zinc oxide (ITO). Of the first transparent electrode 11 and the second transparent electrode 21, the surface of at least second transparent electrode 21 is planarized to an extent that a smooth reflective layer (mirror surface) can be formed, as described later.

The projections 23 are transparent insulators and each formed, for example, of resin. In the example shown in FIG. 2, the projection 23 has substantially a triangular cross-sectional shape along a Y-Z plane defined by the second direction Y and the third direction Z. Each projection 23 includes a first slope 23A on a side facing the light sources LS and a second slope 23B on an opposite side to the first slope 23A. The second transparent electrode 21 is provided on the first slope 23A and uncovers the second slope 23B. The first transparent electrode 11, the second transparent electrode 21 and the second slope 23B are in contact with the electrolyte layer EL.

The first transparent layer 12 and the second transparent layer 22 are formed of an inorganic insulating material or organic insulating material. The refractive index of the first transparent layer 12 is lower than the refractive index of the first transparent substrate 10. The refractive index of the second transparent layer 22 is lower than the refractive index of the second transparent substrate 20. For example, the refractive indices $n1$ of the first transparent substrate 10 and the second transparent substrate 20 are about 1.5, and the refractive indices $n2$ of the first transparent layer 12 and the second transparent layer 22 are about 1.4 ($n1>n2$).

The electrolyte layer EL is provided between the first transparent substrate 10 and the second transparent substrate 20. The electrolyte layer EL is formed of a liquid electrolyte containing an electrochromic material containing silver, for example. When no voltage is being applied, the electrolyte layer EL is substantially transparent. Note that, in this embodiment, silver is used as an example, but the material is not limited to this. In place of silver, a liquid electrolyte containing an electrochromic material which contains some other reflective material capable of oxidation-reduction of, for example, a metal such as platinum, gold, aluminum, manganese or lead, may be used as the electrolyte layer EL.

Note here that, between the electrolyte layer EL and the first transparent electrode 11, or between the electrolyte layer EL and the second transparent electrode 21, some other functional layer such as an electrochromic layer may be provided.

The illumination device IL further comprises a illuminance sensor 100, a sensor controller 110, a light source controller 111, and a voltage controller 112. The illuminance sensor 100 measures the illuminance of external light incident on the illumination device IL. Based on the illuminance measured by the illuminance sensor 100, the sensor controller 110 outputs a control signal to the light source controller 111 and the voltage controller 112, respectively. In the illumination device IL, the sensor controller 110 outputs a control signal to execute the first mode when the measured illuminance is equal to or above a predetermined threshold (bright place). When the measured illuminance is less than the predetermined threshold (dark place), the sensor controller 110 outputs a control signal to execute the second mode, which will be described below.

The light source controller 111 controls the light sources LS based on the control signal from the sensor controller 110. The voltage controller 112 controls the voltage to be applied to the electrolyte layer EL based on the control signal from the sensor controller 110.

The first mode will be described with reference to FIG. 2.

The light source controller 111 turns off the light sources LS based on the control signal from the sensor controller 110. The voltage controller 112 controls the voltages of the first transparent electrode 11 and the second transparent electrode 21 so as to create a transparent state in the electrolyte layer EL based on the control signal from the sensor controller 110. For example, the voltage controller 112 carries out controlling so that no voltage is applied to the electrolyte layer EL. Thus, the transparent state is created in the electrolyte layer EL.

In the illumination device IL in the first mode having such a state as above, the external light LO transmitted through the second substrate SUB2 is not substantially reflected in the electrolyte layer EL and is transmitted through the first substrate SUB1. At this time, the external light LO reaching the second transparent electrodes 21 and the projections 23 is also not substantially reflected and transmitted through the first substrate SUB1. Here, although the illustration is omitted, the light transmitted through the first substrate SUB1 is as well similarly transmitted through the second substrate SUB2.

FIG. 3 is a diagram illustrating the second mode in the illumination device IL shown in FIG. 1. In the second mode, the light source controller 111 turns on the light sources LS based on the control signal from the sensor controller 110. The voltage controller 112 controls the voltages of the first transparent electrode 11 and the second transparent electrode 21 to form the reflective layer 25 on the second transparent electrode 21 based on the control signal from the sensor controller 110. For example, the voltage controller 112 controls the potential of the second transparent electrode 21 to be of a negative polarity relative to the potential of the first transparent electrode 11. Thus, when a predetermined voltage is being applied to the electrolyte layer EL, silver ions dissolved to the electrolyte layer EL are reduced, and fine particles of silver 24 are precipitated on the surface of the second transparent electrode 21. Therefore, the second transparent electrode 21 is covered by the precipitated silver 24, and the reflective layer 25 is formed as an aggregate of the agglomerated silver 24. Note that when the application of voltage to the electrolyte layer EL is released, the precipitated silver is oxidized to silver ions, which are eluted into the electrolyte layer EL.

In the electrochromic device EC with such a configuration, by controlling the voltage applied to the electrolyte layer EL, silver can be precipitated on the surface of the first transparent electrode 11. Here, when relatively large irregularities are formed on the surface of the first transparent electrode 11, the incident light onto the electrochromic element EC is diffusely reflected by the precipitated silver. In this manner, a light-shielding state (or black state) can be created in the electrochromic element EC.

In the illumination device IL in the second mode having such a configuration, the illumination light L1 emitted from the light source LS propagates along the second direction Y between the first transparent layer 12 and the second transparent layer 22. Then, the illumination light L1 reaching the reflection layer 25 is reflected toward the first substrate SUB1 and transmitted through the first substrate SUB1. At this time, since the reflective layer 25 is formed on a first slope 23A, the illumination light propagating along the second direction Y is reflected in a direction close to the normal direction (or the third direction Z) of the illumination device IL, and then transmitted through the first substrate SUB1.

Further, the illumination light L1 propagating between the first transparent electrode 11 and the reflective layer 25 further propagates along the second direction Y and is reflected by the other reflective layer 25.

Figure 4:
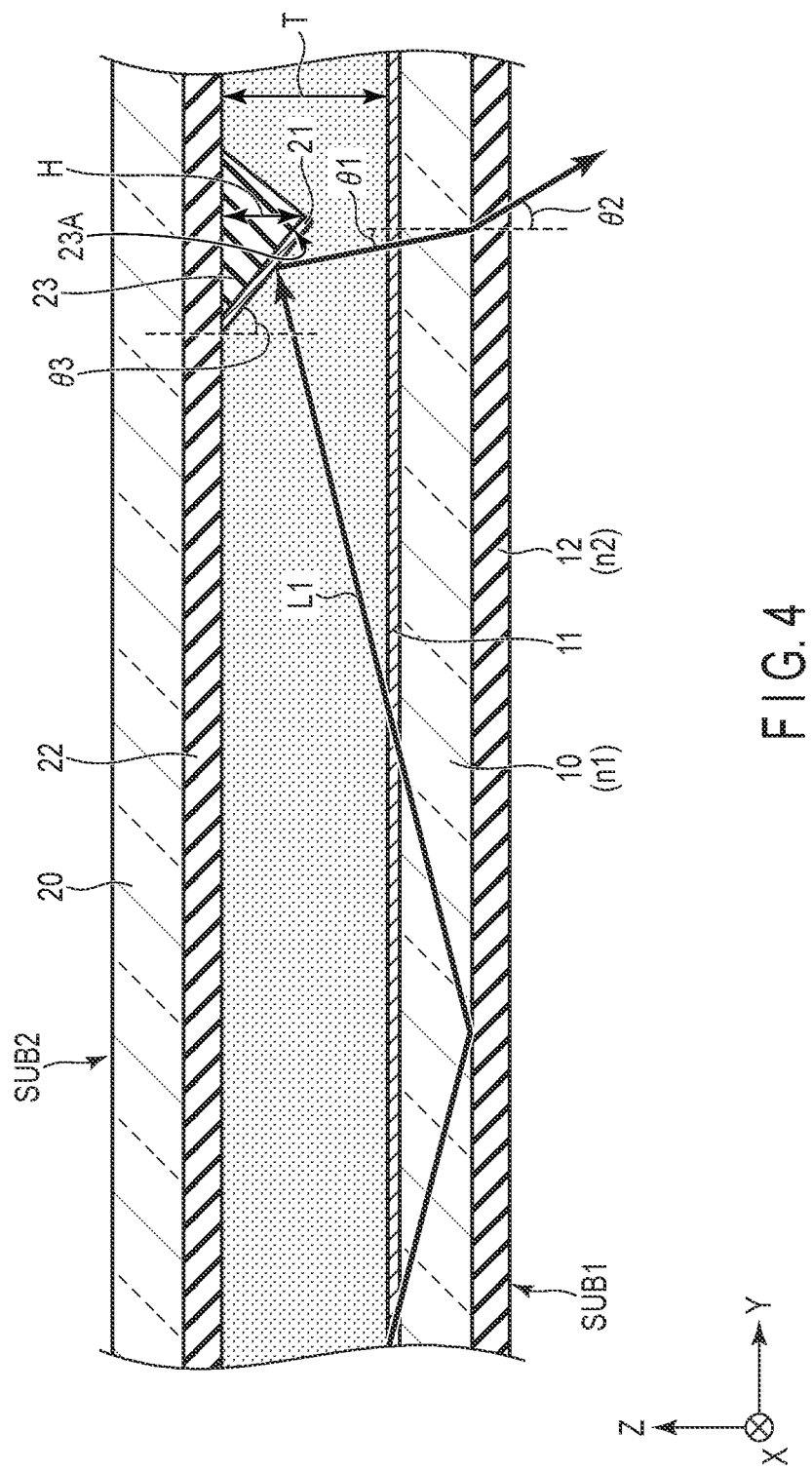
FIG. 4 is a diagram illustrating an inclined angle of a first slope 23A.

FIG. 4 is a diagram illustrating the inclined angle of the first slope 23A. Here, the incident angle of light L1 to the first substrate SUB1 is defined as θ1, the emission angle of light L1 from the first substrate SUB1 is defined as θ2, and the inclination angle of the first slope 23A is defined as θ3.

The angles θ1 and θ3 are all relative to the normal line parallel to the third direction Z (indicated by the dotted line in the figure). The inclination angle θ3 is expressed by the following equation. Note that in the formula, n1 represents the refractive index of the first transparent substrate 10, and n2 represents the refractive index of the first transparent layer 12.

$$\theta 3=\pi-(\sin^{-1}(n1/n2)-\sin^{-1}(\sin \theta 2 \ast n1/n2))$$

In the illumination device IL of this embodiment, the illumination light L1 propagating along the second direction Y is reflected along the normal direction of the illumination device IL. From this point of view, in order to have an emission angle θ2 of 0° to 15°, the inclination angle θ3 is set to 20° to 35°.

Figure 5:
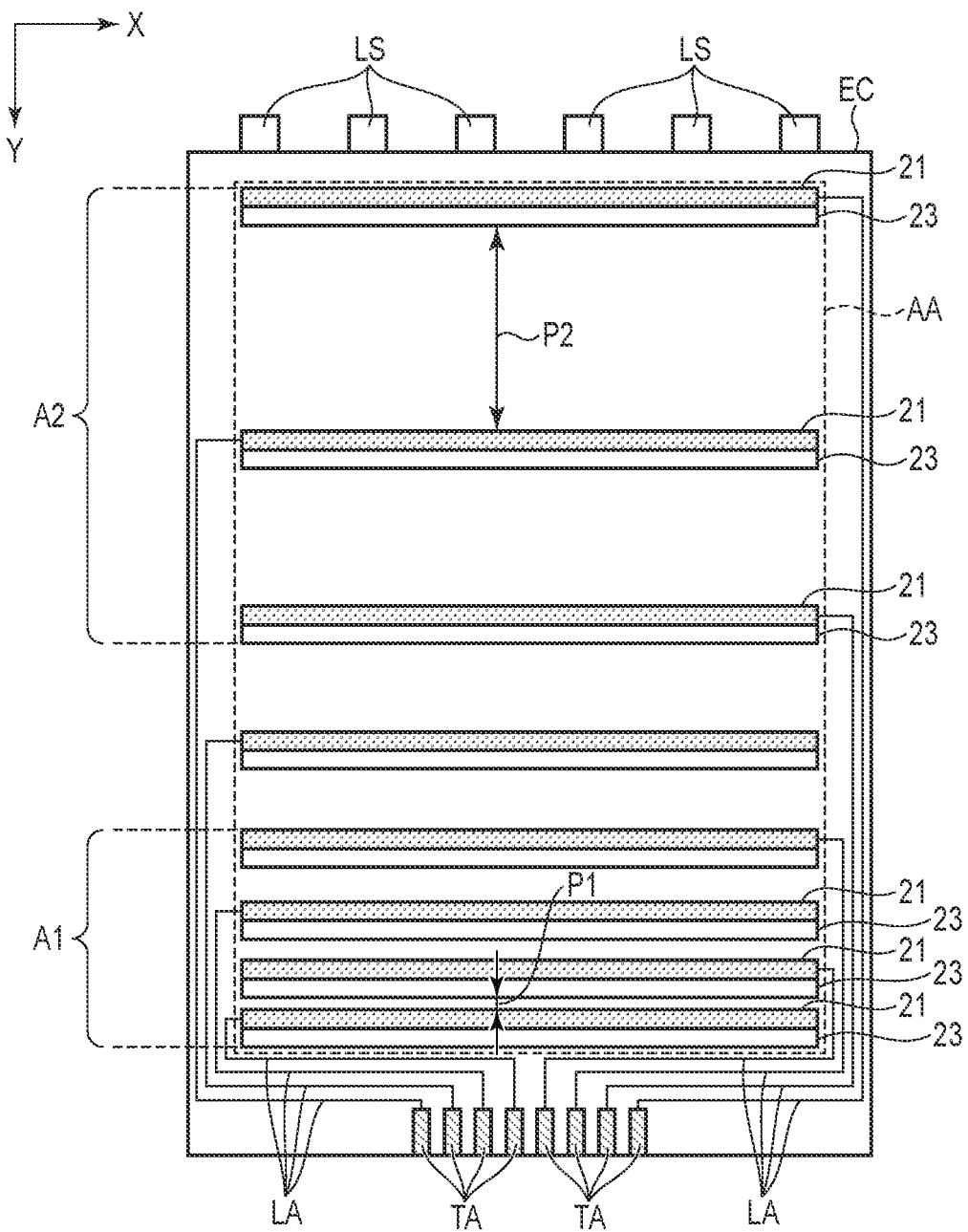
FIG. 5 is a plan view showing a configuration example of a projection 23 provided on an electrochromic element EC.

FIG. 5 is a plan view showing a configuration example of the projections 23 provided on the electrochromic element EC. The light sources LS are arranged to be spaced apart from each other along the first direction X. The projections 23 each extend along the first direction X and are arranged to be spaced apart from each other along the second direction Y. The second transparent electrode 21 is provided on each of the projections 23. As described above, the second transparent electrode 21 is formed so as to cover a part of the projection 23 (the slope on the side facing the light sources LS). In plan view, the area of the second transparent electrode 21 should preferably be 50% or less of the area of the projection 23 from the viewpoint that transmission of light is not interfered with the when the reflective layer 25 is formed on the second transparent electrode 21.

Each of the second transparent electrodes 21 is electrically connected to a respective wiring line LA. The wiring lines LA are provided on an outer side of the active area AA and are formed of a metal material such as aluminum. Each of the wiring lines LA is electrically connected to a respective terminal TA. The terminals TA are electrically connected to the wiring substrate F1 shown in FIG. 1.

The electrochromic element EC includes a first region A1 and a second region A2 in the active area AA. The second region A2 is located between the light sources LS and the first region A1. The distance P1 between adjacent projections 23 in the first region A1 is less than the distance P2 between adjacent projections 23 in the second region A2. In other words, the projections 23 are more densely arranged as the location is farther from the light source LS, or more sparsely arranged as the location is closer to the light sources LS. Further, the second transparent electrodes 21 for forming the reflective layer 25 are densely arranged as the location is farther from the light sources LS, or more sparsely as it is closer to the light sources LS.

The illumination light L1 from the light sources LS gradually attenuates as it propagates along the second direction Y. Further, as explained with reference to FIG. 3, the illumination light L1 is reflected by the reflective layer 25. Therefore, the luminance of the illumination light L1 in the first region A1, which is distant away from the light source LS, is extremely lower than that of the illumination light L1 in the second region A2. In this embodiment, the second transparent electrodes 21 are more densely arranged as the location is farther away from the light source LS. With this configuration, when the reflective layers 25 are formed on the second transparent electrodes 21, the reflection of the illumination light L1 in the second region A2 is suppressed whereas the reflection of the illumination light L1 in the first region A1 is promoted. As a result, the difference in luminance between the first region A1 and the second region A2 is reduced.

Another Configuration Example of Electrochromic Element EC

Figure 6:
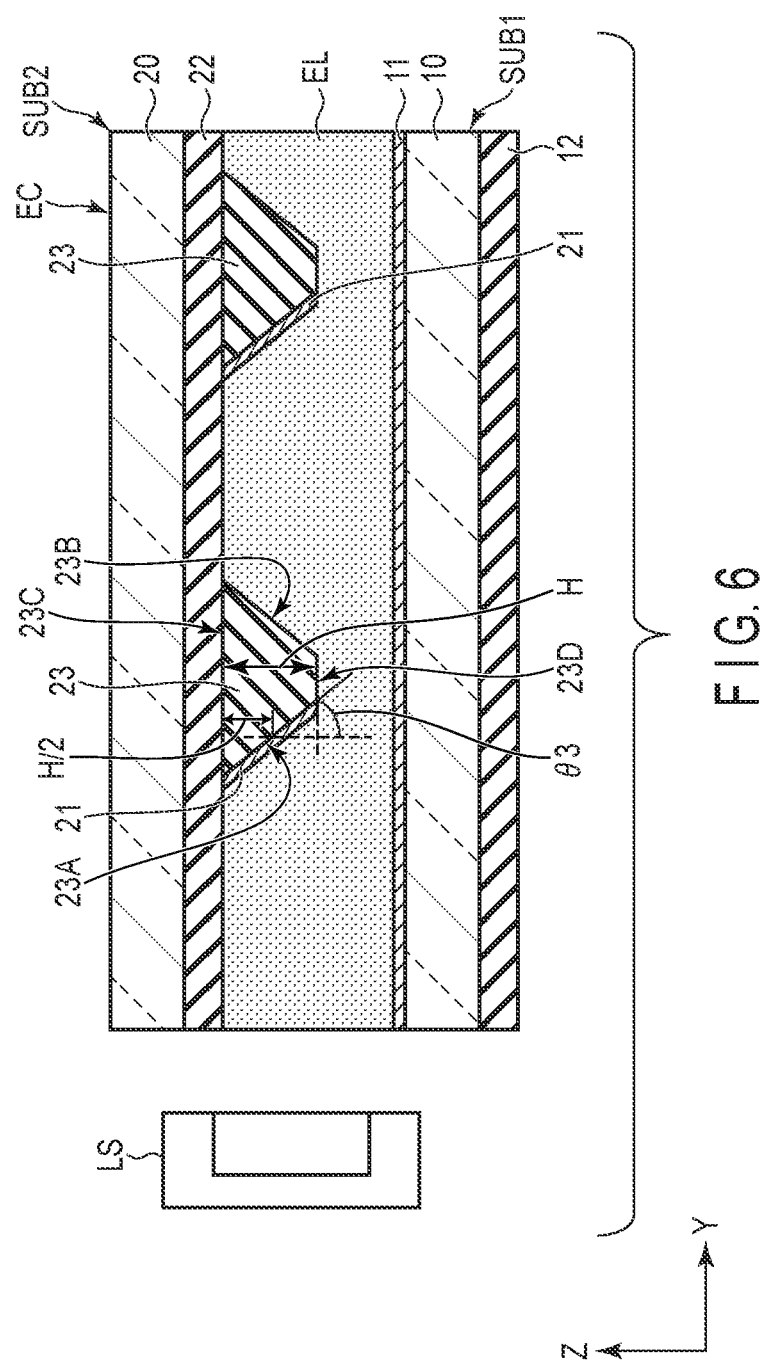
FIG. 6 is a cross-sectional view showing another configuration example of the electrochromic element EC.

FIG. 6 is a cross-sectional view showing another configuration example of the electrochromic element EC. The configuration example shown in FIG. 6 is different from that of FIG. 2 or the like in that the projections 23 have substantially a trapezoidal cross-sectional shape in cross-sectional view. The projections 23 each include a first slope 23A on the side facing the light source LS, a second slope 23B on an opposite side to the first slope 23A, an upper surface 23C in contact with the second transparent layer 22 and a lower surface 23D facing the first substrate SUB1. Along the second direction Y, the width of the upper surface 23C is greater than the width of the lower surface 23D. For the inclination angle θ3 of the first slope 23A, see the explanation provided above with reference to FIG. 4. However, if the first slope 23A is not a plane, the inclination angle θ3 can be defined as, for example, an angle between the tangent line of the first slope 23A at the position of ½ of the height H of the projection 23 and the normal line.

The second transparent electrode 21 is provided on the first slope 23A and uncovers the second slope 23B and the lower surface 23D.

FIG. 7 is a cross-sectional view showing another configuration example of the electrochromic device EC. The configuration example shown in FIG. 7 is different from that of FIG. 2 or the like in that the projection 23 have a semicircular cross-sectional shape in cross-sectional view. The projections 23 each include a first slope 23A on the side facing the light sources LS and a second slope 23B on an opposite side to the first slope 23A. The first slope 23A and the second slope 23B are curved surfaces. The second transparent electrode 21 is provided on the first slope 23A and exposes the second slope 23B. The inclination angle θ3 of the first slope 23A can be defined as, for example, an angle between the tangent line of the first slope 23A at the position of ½ of the height H of the projection 23 and the normal line. Or, if the radius of curvature of the projections 23 is not constant in the cross-sectional view, the inclination angle θ3 can be defined as the angle between the tangent line of the first slope 23A at the position where the radius of curvature takes an average value and the normal line. The case where the radius of curvature of the projection 23 is not constant is, for example, that where the projections 23 are each a semi-ellipse.

Display Device

Next, a display panel PNL that can be combined with the illumination device IL described above will be described.

Figure 8:
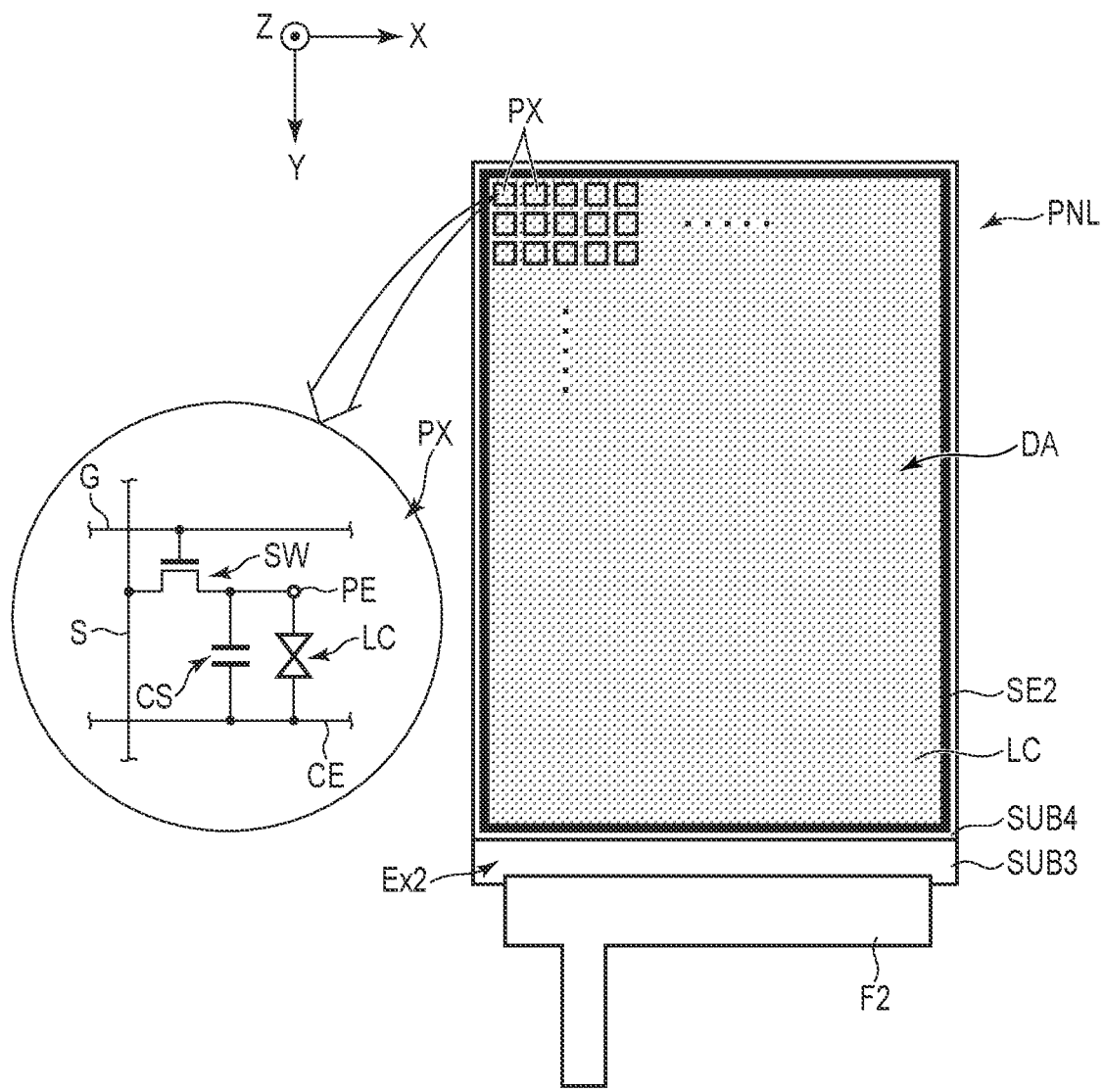
FIG. 8 is a plan view showing a configuration example of a display panel PNL.

FIG. 8 shows a plan view of a configuration example of the display panel PNL. The display panel PNL in this embodiment is a reflective display panel that displays images by selectively reflecting external light. Examples of the reflective display panel include a liquid crystal panel with a liquid crystal layer and a display panel with an electrophoretic layer. A liquid crystal panel will be described below as an example of the display panel PNL.

The display panel PNL comprises a third substrate SUB3, a fourth substrate SUB4, a liquid crystal layer LC and a sealant SE2. The third substrate SUB3 and the fourth substrate SUB4 4 overlap each other in plan view. The third substrate SUB3 and the fourth substrate SUB4 are adhered together by the sealant SE2. The liquid crystal layer LC is held between the third substrate SUB3 and the fourth substrate SUB4 and is sealed by the sealant SE2. The area surrounded by the sealant SE2 includes a display area DA where images are displayed.

The display area DA includes a plurality of pixels PX arranged in a matrix along the first direction X and the second direction Y. As enlargedly shown in FIG. 8, each pixel PX comprises a switching element SW, a pixel electrode PE, a common electrode CE, a liquid crystal layer LC and the like. The switching element SW is constituted by a thin-film transistor (TFT), for example, and is electrically connected to a scanning line G and a signal line S. The scanning line G is electrically connected to the switching element SW in each of the pixels PX arranged along the first direction X. The signal line S is electrically connected to the switching element SW of each of the pixels PX arranged along the second direction Y. The pixel electrode PE is electrically connected to the switching element SW. The common electrode CE is provided commonly for a plurality of pixel electrodes PE. The liquid crystal layer LC is driven by the electric field generated between the pixel electrode PE and the common electrode CE. The capacitance CS is formed, for example, between an electrode of the same potential as that of the common electrode CE and the electrode of the same potential as that of the pixel electrode PE. For example, the scanning lines G, the signal lines S, the switching elements SW and the pixel electrodes PE are provided on the third substrate SUB3, and the common electrode CE is provided on the fourth substrate SUB4.

The wiring substrate F2 is mounted on the extended portion Ex2 of the third substrate SUB3. The extended portion Ex2 corresponds to the portion of the third substrate SUB3, which does not overlap the fourth substrate SUB4. The wiring substrate F2 is, for example, a bendable flexible printed circuit board.

Figure 9:
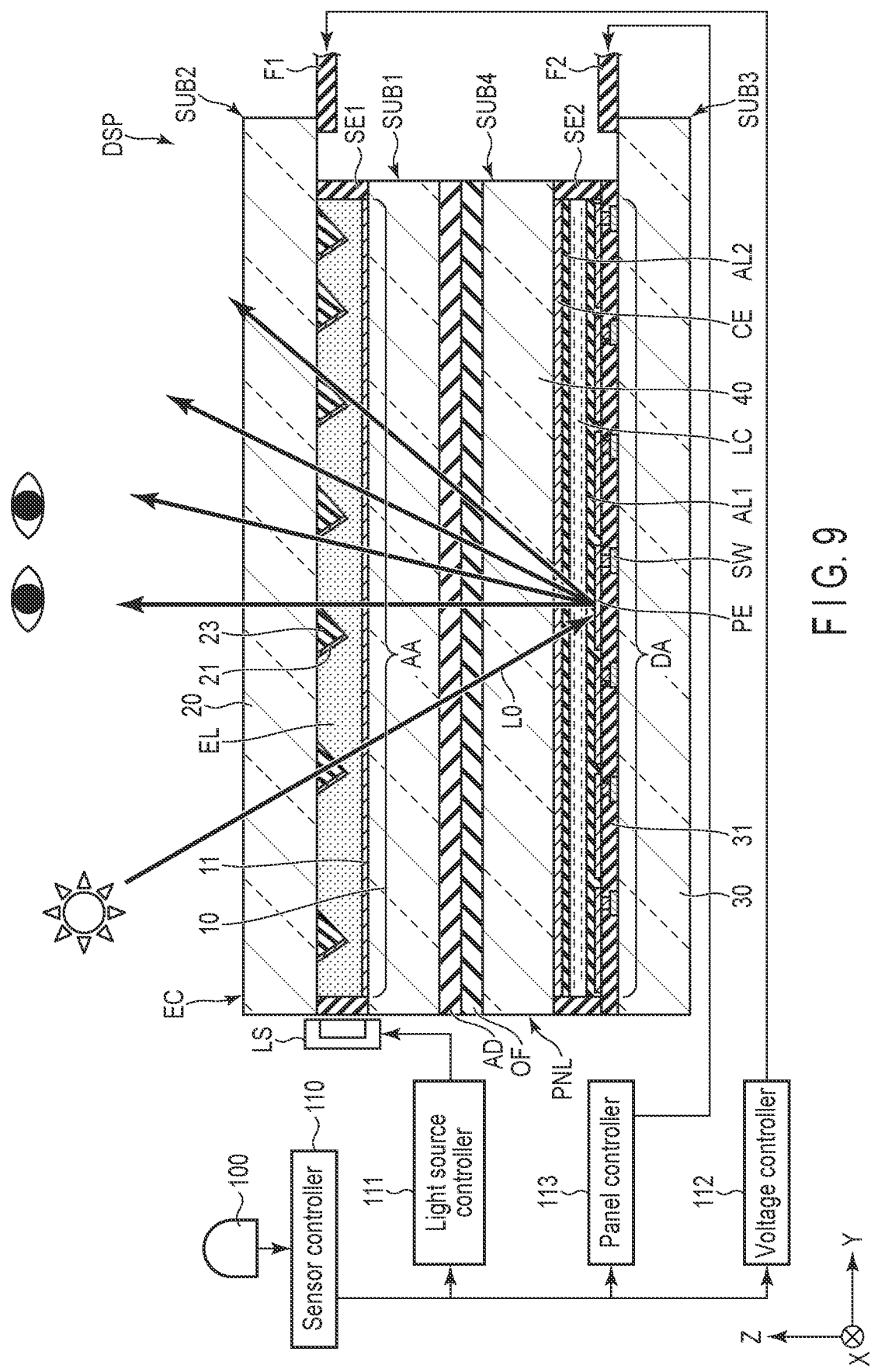
FIG. 9 is a diagram illustrating a first display mode in a display device DSP of the embodiment.

FIG. 9 is a diagram illustrating the first display mode in the display device DSP of this embodiment.

First, with reference to FIG. 9, an example of the cross-sectional structure of the display device DSP will be described.

The display device DSP comprises, in addition to the light sources LS and the electrochromic element EC that constitute the illumination device IL described above, a display panel PNL described with reference to FIG. 8, an optical film OF and an adhesive AD. As an example of the display panel PNL, a basic configuration of a vertical electric field type liquid crystal panel will be described below.

The third substrate SUB3 comprises a third transparent substrate 30, a transparent insulating film 31, switching elements SW, pixel electrodes PE, and an alignment film AL1. The switching element SW is provided between the third transparent substrate 30 and the insulating film 31. The pixel electrodes PE are electrically connected to the switching elements SW, respectively. The alignment film AL1 covers the pixel electrodes PE.

The fourth substrate SUB4 comprises a fourth transparent substrate 40, a common electrode CE and an alignment film AL2. The common electrode CE is provided over substantially the entire area of the display area DA, and faces the pixel electrodes PE along the third direction Z. The alignment film AL2 covers the common electrode CE. The liquid crystal layer LC is located between the alignment film AL1 and the alignment film AL2.

The third transparent substrate 30 and the fourth transparent substrate 40 are, for example, insulating substrates such as glass substrate or resin substrate. The pixel electrodes PE each include a reflective electrode. That is, the pixel electrode PE may be a reflective electrode, or the pixel electrode PE may be a stacked layer body of a transparent electrode and a reflective electrode. For example, the pixel electrode PE is a reflective electrode formed, for example, of a light-reflective metal material such as silver or aluminum. The common electrode CE is a transparent electrode formed, for example, of a transparent conductive material such as ITO or IZO.

Note that the display panel PNL may comprise a color filter layer, a light-shielding layer and the like, but these are not shown here.

The optical film OF is adhered to the fourth transparent substrate 40. The optical film OF is a film for selectively transmitting reflected light from the reflective display panel PNL, and includes, for example, a polarizer and a retardation film. Note that the optical film OF may be adhered to the first transparent substrate 10.

For the electrochromic element EC, only the main part is shown in the figure. The electrochromic element EC overlaps the display panel PNL. The active area AA of the electrochromic element EC overlaps the display area DA of the display panel PNL. In the example shown in FIG. 9, the display panel PNL and the electrochromic element EC are arranged such that the fourth substrate SUB4 and the first substrate SUB1 face each other along the third direction Z. Further, the display panel PNL and electrochromic element EC are adhered by a transparent adhesive AD interposed between the optical film OF and the first transparent substrate 10. From the viewpoint of suppressing undesired reflection and scattering at the boundary between the display panel PNL and the electrochromic element EC, it is preferable that the refractive index of the adhesive AD should be equivalent to the refractive index of the first transparent substrate 10 and the optical film OF. Further, the adhesive AD may be formed as a first transparent layer 12 provided on the first substrate SUB1.

The display device DSP comprises a panel controller 113 in addition to the illuminance sensor 100, the sensor controller 110, the light source controller 111 and the voltage controller 112. The voltage controller 112 is electrically connected to the wiring substrate F1. The panel control section 113 is electrically connected to the wiring substrate F2. The panel controller 113 controls the display panel PNL based on the image data and controls the drive voltage corresponding to each mode based on the control signal from the sensor controller 110.

The first display mode will be described with reference to FIG. 9.

The sensor controller 110 outputs a control signal to execute the first display mode when the illuminance measured by the illuminance sensor 100 is equal to or above a predetermined threshold (bright place). The light source controller 111 turns off the light sources LS based on the control signal from the sensor controller 110. The voltage controller 112 controls the voltages of the first transparent electrode 11 and the second transparent electrode 21 so as to create a transparent state in the electrolyte layer EL based on the control signal from the sensor controller 110.

In the display device DSP in the first display mode having such a configuration, the external light L0 transmitted through the second substrate SUB2 is transmitted through the first substrate SUB1 and illuminates the display panel PNL. The external light L0 is natural light. Of the external light L0, the component transmitted through the optical film OF is reflected by the pixel electrodes PE. Of the external light L0 reflected by the pixel electrodes PE, the component transmitted through the optical film OF is transmitted through the first substrate SUB1 and the second substrate SUB2.

As described above, when the environment in which the display device 1 is operated is a bright place, the images are displayed by selectively reflecting the external light L0.

Figure 10:
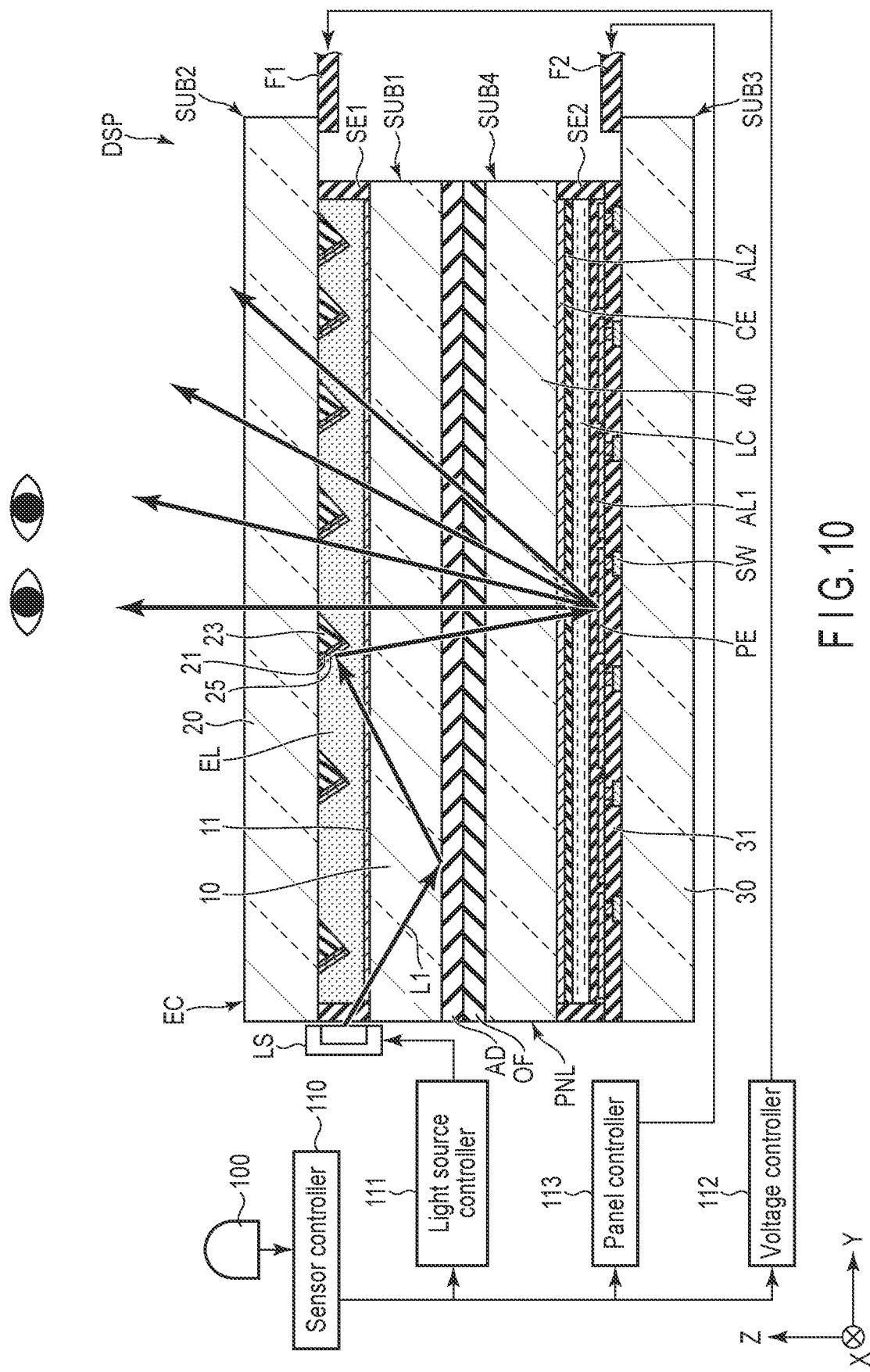
FIG. 10 is a diagram illustrating a second display mode in the display device DSP of the embodiment.

FIG. 10 is a diagram illustrating the second display mode in the display device DSP of the embodiment.

When the illuminance measured by the illuminance sensor 100 is less than a predetermined threshold (dark place), the sensor controller 110 outputs a control signal to execute the second display mode. The light source controller 111 turns on the light sources LS based on the control signal from the sensor controller 110. The voltage controller 112 controls the voltages of the first transparent electrode 11 and the second transparent electrode 21 to form the reflective layer 25 on the second transparent electrode 21 based on the control signal.

In the display device DSP in the second display mode having such a configuration, the illumination light emitted from the light sources LS enters the electrochromic element EC and propagates along the second direction Y. Of the illumination light L1 that propagates through the electrolyte layer EL, the illumination light L1 reflected by the reflection layer 25 is transmitted through the first substrate SUB1 and illuminates the display panel PNL. The illumination light L1 is natural light. Of the illumination light L1, the component transmitted through the optical film OF is reflected by the pixel electrodes PE. Of the illumination light L1 reflected by the pixel electrodes PE, the component transmitted through the optical film OF is transmitted through the first substrate SUB1 and the second substrate SUB2.

Thus, when the operating environment of the display device 1 is a dark place, the images are displayed by selectively reflecting the illumination light L1.

According to this embodiment, it is possible to provide a display device DSP that can switch between the first display mode and the second display mode depending on the operating environment. In the first display mode, the reflective layer 25 is not formed on the electrochromic element EC, and therefore most of the external light L0 entering the electrochromic element EC contributes to the illumination of the display panel PNL, thus making it possible to improve the efficiency of using the external light. In the first display mode, the reflective layer 25 is not formed and no light guide pattern such as of unevenness exist, and therefore the display quality of the images displayed on the display panel PNL can be improved.

In the second display mode, the reflective layer 25 is formed locally on the electrochromic element EC, and the illumination light L1 from the light source LS is reflected toward the display panel PNL. In this embodiment, compared to the case where the reflective layer 25 is not formed on the electrochromic element EC, the ratio of the illumination light L1 that contributes to the illumination of the display panel PNL increases, thus improving the use efficiency of the illumination light L1. With the improvement in the use efficiency of the illumination light L1, it is possible to reduce the luminance of the light sources LS, and therefore the power consumption can be reduced.

Further, the reflected light at the reflective layer 25 is reflected in a direction close to the normal direction of the display panel PNL. As a result, the luminance when the display device DSP is observed from the front can be improved.

Further, the reflective layers 25 formed in the second display mode are arranged more densely as the location is farther away from the light sources LS, or more sparsely as it is closer to the light sources LS. For this reason, the difference in luminance between the first region A1, which is separated from the light sources LS and the second region A2, which is closer to the light sources LS, can be reduced. Thus, the entire area of the display panel PNL can be illuminated at substantially uniform luminance.

Further, the reflective layer 25 is formed inside the electrochromic element EC (the electrolyte layer EL) in the second display mode, and not formed in the first display mode. Therefore, in this embodiment, compared to the case where a light guiding pattern such as of unevenness is provided, undesired scattering can be suppressed, and the decrease in the contrast ratio of the images displayed on the display panel PNL can be suppressed.

Another Configuration Example of Display Device

Figure 11:
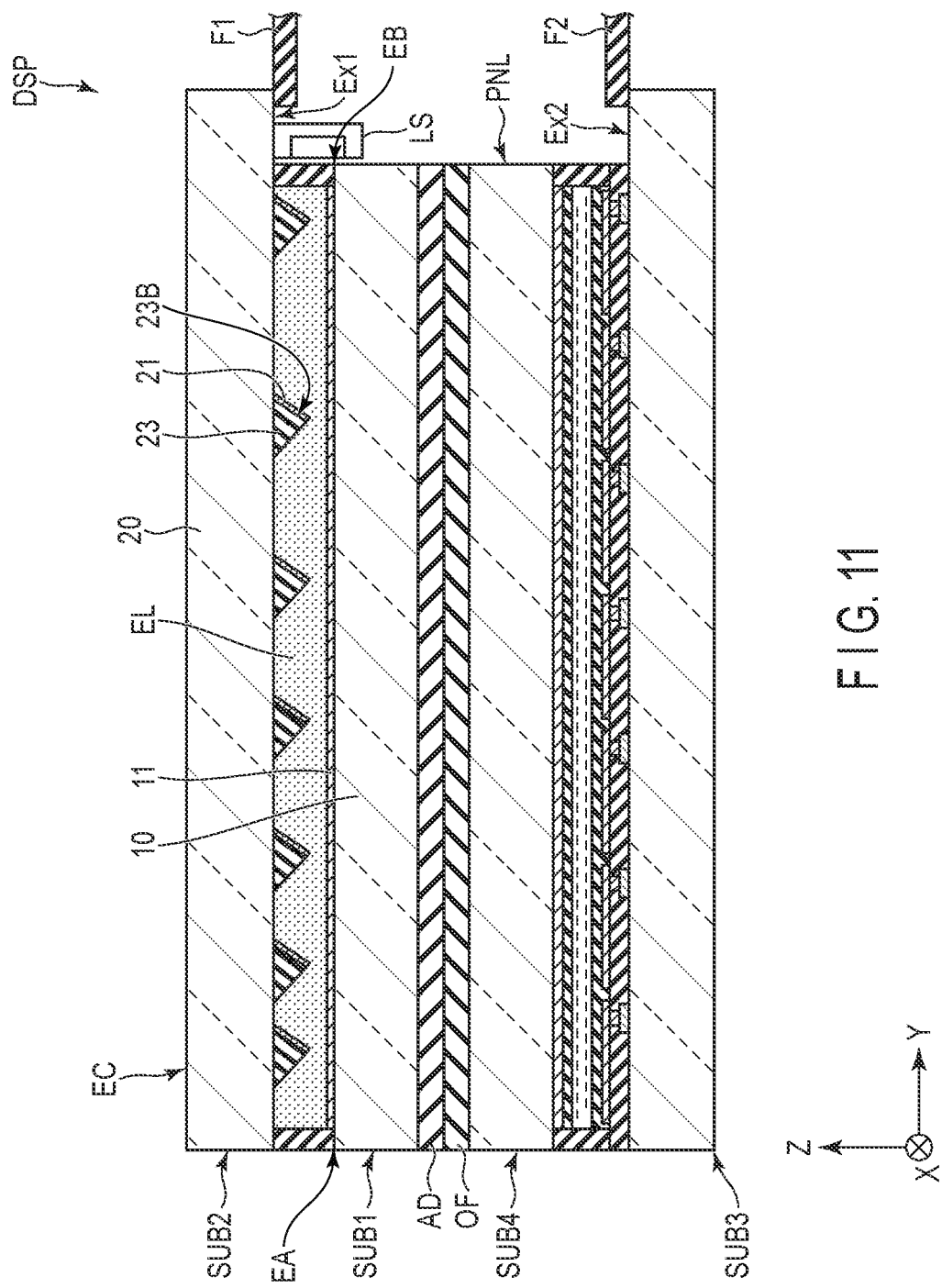
FIG. 11 is a cross-sectional view showing another configuration example of the display device DSP the embodiment.

FIG. 11 is a cross-sectional view showing another configuration example of the display device DSP of this embodiment. The configuration example shown in FIG. 11 is different from that of FIG. 9 in that the light sources LS are provided between the extended portion Ex1 of the electrochromic element EC and the extended portion Ex2 of the display panel PNL. In other words, the configuration example shown in FIG. 11 corresponds to the case where the light sources LS shown in FIG. 1 are provided on the extended portion Ex1. The light sources LS are provided on the side edge EB on an opposite side to the side edge EA of the electrochromic element EC, and emit illumination light toward the side edge EB.

The second transparent electrode 21 is provided on the second slope 23B on the side facing the light sources LS in each projection 23.

In such a configuration example, advantageous effects similar to those of the configuration examples above can be obtained. In addition, since the light sources LS are accommodated between the extended portions Ex1 and Ex2, the length of the display device DSP along the second direction Y can be shortened.

As explained above, according to the present embodiments, it is possible to provide an illumination device and a display device that can improve the use efficiency of light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed herein will be provided below as additional notes.

(1)

A illumination device comprising:

an electrochromic element; and light sources provided on a side edge of the electrochromic element, the electrochromic element comprising:

a first transparent substrate;

a first transparent electrode provided on the first transparent substrate;

a second transparent substrate opposing the first transparent substrate;

a projection provided on the second transparent substrate and projecting toward the first transparent substrate;

a second transparent electrode provided on a part of each of the projections; and an electrolyte layer provided between the first transparent substrate and the second transparent substrate and containing an electrochromic material including a reflective material capable of oxidation-reduction.

(2)

The illumination device of item (1), wherein the projections include a first slope on a side facing the light sources and a second slope on an opposite side to the first slope, and the second transparent electrode is provided on the first slope and uncovers the second slope.

(3)

The illumination device of item (1) or (2), comprising:

a first transparent layer provided on the first transparent substrate; and a second transparent layer provided on the second transparent substrate, wherein a refractive index of the first transparent layer is less than a refractive index of the first transparent substrate, and a refractive index of the second transparent layer is less than a refractive index of the second transparent substrate.

(4)

The illumination device of any one of items (1) to (3), comprising:

an illuminance sensor;

a light source controller which controls the light sources; and a voltage controller which controls a voltage applied to the electrolyte layer, wherein when illuminance measured by the illuminance sensor is equal to or above a predetermined threshold, the light source controller turns off the light sources, and the voltage controller controls the voltage to create a transparent state in the electrolyte layer, when the illuminance measured by the illuminance sensor is less than a predetermined threshold, the light source controller turns on the light sources, and the voltage controller controls the voltage to form a reflective layer on the second transparent electrode.

(5)

The illumination device of any one of items (1) to (4), wherein the light sources are arranged to be spaced apart from each other along a first direction, and the projections extend in the first direction.

(6)

The illumination device of item (5), wherein the projections are arranged to be spaced apart from each other along a second direction intersecting the first direction, the second transparent electrode is provided on each of the projections, and an interval between adjacent pair of projections in a first region is less than an interval between adjacent pair of projections in a second region between the light sources and the first region.

(7)

The illumination device of any one of items (1) to (6), wherein the reflective material capable of oxidation-reduction is silver.

(8)

A display device comprising:

a display panel which is reflective type;

an electrochromic element overlapping the display panel; and light sources provided on a side edge of the electrochromic element, the electrochromic element comprising:

a first transparent substrate;

a first transparent electrode provided on the first transparent substrate;

a second transparent substrate opposing the first transparent substrate;

projections provided on the second transparent substrate and projecting toward the first transparent substrate;

a second transparent electrode provided on a part of each of the projections; and an electrolyte layer provided between the first transparent substrate and the second transparent substrate and containing an electrochromic material including a reflective material capable of oxidation-reduction.

(9)

The display device of item (8), comprising:

a transparent adhesive which adheres the electrochromic element to the display panel.

(10)

The display device of item (8) or (9), wherein the display panel comprises a switching element provided for each pixel, a pixel electrode electrically connected to the switching element and a common electrode provided over a plurality of pixels, and the pixel electrode includes a reflective electrode.

(11)

The display device of any one of items (8) to (10), wherein the projections include a first slope on a side facing the light sources and a second slope on an opposite side to the first slope, and the second transparent electrode is provided on the first slope and uncovers the second slope.

(12)

The display device of any one of items (8) to (11), comprising:

a first transparent layer provided on the first transparent substrate; and a second transparent layer provided on the second transparent substrate, wherein a refractive index of the first transparent layer is lower than a refractive index of the first transparent substrate, and a refractive index of the second transparent layer is lower than a refractive index of the second transparent substrate.

(13)

The display device of any one of items (8) to (2), comprising:

an illuminance sensor;

a light source controller which controls the light sources; and a voltage controller which controls voltage applied to the electrolyte layer, wherein when illuminance measured by the illuminance sensor is equal to or above a predetermined threshold, the light source controller turns off the light sources, and the voltage controller controls the voltage to create a transparent state in the electrolyte layer, and when the illuminance measured by the illuminance sensor is less than the predetermined threshold, the light source controller turns on the light sources, and the voltage controller controls the voltage to form a reflective layer on the second transparent electrode.

(14)

The display device of any one of items (8) to (13), wherein the light sources are arranged to be spaced apart from each other along a first direction, and the projections extend in the first direction.

(15)

The display device of item (14), wherein the projections are arranged to be spaced apart from each other along a second direction intersecting the first direction, the second transparent electrode is provided on each of the projections, and an interval between adjacent pair of projections in a first region is less than an interval between adjacent pair of projections in a second region between the light sources and the first region.

(16)

The display device of any one of items (8) to (15), wherein the reflective material capable of oxidation-reduction is silver.

What is claimed is:

1. An illumination device comprising:
an electrochromic element; and
light sources provided on a side edge of the electrochromic element,
the electrochromic element comprising:
a first transparent substrate;
a first transparent electrode provided on the first transparent substrate;
a second transparent substrate opposing the first transparent substrate;
projections provided on the second transparent substrate and projecting toward the first transparent substrate;
a second transparent electrode provided on a part of each of the projections; and
an electrolyte layer provided between the first transparent substrate and the second transparent substrate and containing an electrochromic material including a reflective material capable of oxidation-reduction.

2. The illumination device of claim 1, wherein
the projections include a first slope on a side facing the light sources and a second slope on an opposite side to the first slope, and
the second transparent electrode is provided on the first slope and uncovers the second slope.

3. The illumination device of claim 1, further comprising:
a first transparent layer provided on the first transparent substrate; and
a second transparent layer provided on the second transparent substrate,
wherein
a refractive index of the first transparent layer is less than a refractive index of the first transparent substrate, and a refractive index of the second transparent layer is less than a refractive index of the second transparent substrate.

4. The illumination device of claim 1, further comprising:
an illuminance sensor;
a light source controller which controls the light sources; and
a voltage controller which controls a voltage applied to the electrolyte layer,
wherein
when illuminance measured by the illuminance sensor is equal to or above a predetermined threshold, the light source controller turns off the light sources, and the voltage controller controls the voltage to create a transparent state in the electrolyte layer, and
when the illuminance measured by the illuminance sensor is less than the predetermined threshold, the light source controller turns on the light sources, and the voltage controller controls the voltage to form a reflective layer on the second transparent electrode.

5. The illumination device of claim 1, wherein
the light sources are arranged to be spaced apart from each other along a first direction, and
the projections extend in the first direction.

6. The illumination device of claim 5, wherein
the projections are arranged to be spaced apart from each other along a second direction intersecting the first direction,
the second transparent electrode is provided on each of the projections, and
an interval between adjacent pair of projections in a first region is less than an interval between adjacent pair of projections in a second region between the light sources and the first region.

7. The illumination device of claim 1, wherein the reflective material capable of oxidation-reduction is silver.

8. A display device comprising:
a display panel which is reflective type;
an electrochromic element overlapping the display panel; and
light sources provided on a side edge of the electrochromic element,
the electrochromic element comprising:
a first transparent substrate;
a first transparent electrode provided on the first transparent substrate;
a second transparent substrate opposing the first transparent substrate;
projections provided on the second transparent substrate and projecting toward the first transparent substrate;
a second transparent electrode provided on a part of each of the projections; and
an electrolyte layer provided between the first transparent substrate and the second transparent substrate and containing an electrochromic material including a reflective material capable of oxidation-reduction.

9. The display device of claim 8, further comprising:
a transparent adhesive which adheres the electrochromic element to the display panel.

10. The display device of claim 8, wherein
the display panel comprises a switching element provided for each pixel, a pixel electrode electrically connected to the switching element and a common electrode provided over a plurality of pixels, and
the pixel electrode includes a reflective electrode.

11. The display device of claim 8, wherein
the projections include a first slope on a side facing the light sources and a second slope on an opposite side to the first slope, and
the second transparent electrode is provided on the first slope and uncovers the second slope.

12. The display device of claim 8, further comprising:
a first transparent layer provided on the first transparent substrate; and
a second transparent layer provided on the second transparent substrate,
wherein
a refractive index of the first transparent layer is lower than a refractive index of the first transparent substrate, and
a refractive index of the second transparent layer is lower than a refractive index of the second transparent substrate.

13. The display device of claim 8, further comprising:
an illuminance sensor;
a light source controller which controls the light sources; and
a voltage controller which controls voltage applied to the electrolyte layer,
wherein
when illuminance measured by the illuminance sensor is equal to or above a predetermined threshold, the light source controller turns off the light sources, and the voltage controller controls the voltage to create a transparent state in the electrolyte layer, and
when the illuminance measured by the illuminance sensor is less than the predetermined threshold, the light source controller turns on the light sources, and the voltage controller controls the voltage to form a reflective layer on the second transparent electrode.

14. The display device of claim 8, wherein
the light sources are arranged to be spaced apart from each other along a first direction, and
the projections extend in the first direction.

15. The display device of claim 14, wherein
the projections are arranged to be spaced apart from each other along a second direction intersecting the first direction,
the second transparent electrode is provided on each of the projections, and
an interval between adjacent pair of projections in a first region is less than an interval between adjacent pair of projections in a second region between the light sources and the first region.

16. The display device of claim 8, wherein
the reflective material capable of oxidation-reduction is silver.

* * * * *